July 13, 1954  J. F. KOPCZYNSKI  2,683,495
TRACTION DEVICE
Filed Dec. 8, 1950
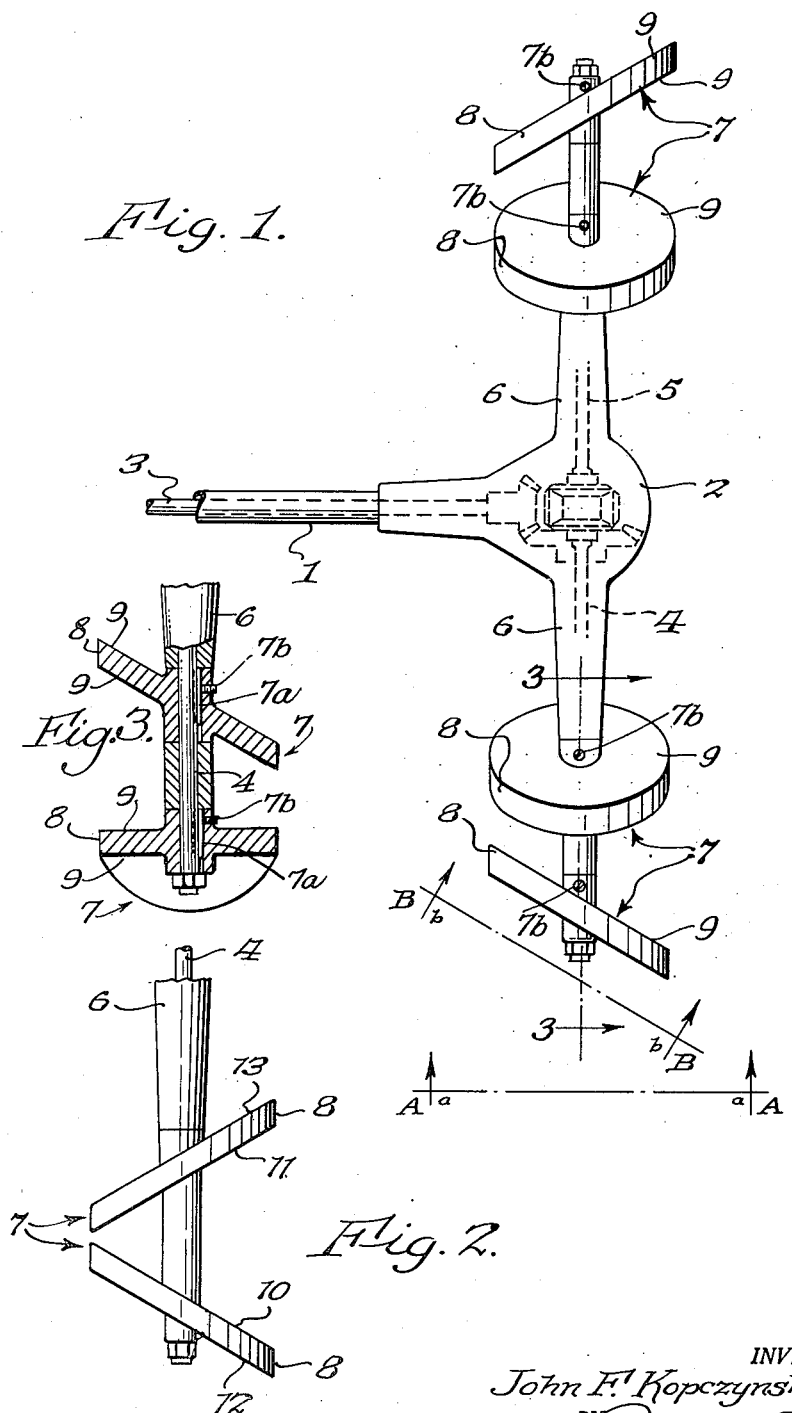
INVENTOR.
John F. Kopczynski
BY
Parker, *illegible*
Attorneys.

Patented July 13, 1954

2,683,495

UNITED STATES PATENT OFFICE 2,683,495

TRACTION DEVICE

John F. Kopczynski, Buffalo, N. Y.

Application December 8, 1950, Serial No. 199,875

3 Claims. (Cl. 180—7)

This invention relates to traction devices of the type which operate very effectively not only over good pavements but also over soft ground and loose snow. Vehicles which operate over poor roads or ordinary ground encounter a great variety of conditions that resist propelling forces on the vehicle. A vehicle may, for example, encounter soft mud or a clay road, or a sand road, or a mixture of the same, or soft snow, and with the ordinary traction wheels, when they encounter loose ground or snow, they tend to spin and dig themselves deeper into the ground or snow. The longer the effort to get them out, the deeper they are apt to mire themselves. Muddy country roads offer a particularly difficult problem to the passage of heavy, power-propelled vehicles because the wheels sink into it and spin idly. Army vehicles, for example, must be designed to operate as successfully as possible under all road and ground conditions which may be encountered, and to have maximum ability to dig themselves out of any soft earth or snow into which they may sink. While some practical progress has been made in recent years in increasing the traction of vehicle wheels, it has been largely in changes in tread patterns. Changes in tread patterns and design have not fully solved the problem of traction in very soft ground.

An object of this invention is to provide an improved driving traction device for vehicles which will be exceptionally successful and practical in propelling a vehicle through soft road conditions; which will not require large diameter wheels; which may be operated at high speeds without undue vertical movements of the vehicle body; which will have maximum traction on soft as well as hard surfaces; which will enable relatively close clearance of the vehicle with the ground; which will operate smoothly at all speeds; which will not require any major changes in the basic design of power-propelled vehicles, and which will be relatively simple, practical and inexpensive.

Various other objects and advantages will be apparent from the following description of some embodiments of the invention, and the novel features will be particularly pointed out hereinafter in connection with the appended claims.

In the accompanying drawings:

Fig. 1 is a plan of a drive mechanism for a motor propelled vehicle and having traction wheels constructed in accordance with this invention; and Fig. 2 is a plan of one end of a rear axle with wheels made in accordance with this invention, but arranged differently, relatively to one another, on the axle.

Fig. 3 is a section of a part of the axle of Fig. 1, with the section taken approximately along the line 3—3 of Fig. 1.

In the illustrated embodiment of the invention, the usual parts of the vehicle body which are not modified by this invention, including the engine and chassis, are omitted, and only the improved traction mechanism is illustrated. This mechanism includes an enclosing tube 1 which extends forwardly from a differential gear housing 2 of any usual construction, and a drive shaft 3 is rotatably mounted within the tube 1 so as to extend from the transmission, not shown, to the differential housing 2. Within the housing 2 are the usual gears and mechanism by which the power of the shaft 3 is delivered through planetary gearing to axially alined axle drive shafts 4 and 5. This is the usual rear end drive used in trucks and automobiles. These shafts 4 and 5 are rotatably mounted in the axle frame or casing 6, and extend beyond the ends of the casing 6, and on each of their outer ends a pair of traction wheels 7 are fixed for rotation therewith. For that purpose the traction wheels 7 are keyed by keys 7a or otherwise fixed on the ends of the shafts 4 and 5 such as by set screws 7b so as to rotate therewith, and the side faces of each traction wheel are oblique to the longitudinal axes of the shafts 4 and 5.

Each traction wheel has a periphery or tread 8 which, in the illustration, is what may be termed as a "flat tread," but which may be tubular like an automobile tire, if desired. The tread periphery, along the line of contact with the ground, is everywhere equidistant from the axis of rotation of the axle shaft on which it is mounted, and has a shape in a direction peripherally of the wheel, that corresponds generally to an oblique section of a cylinder whose longitudinal axis is substantially coincident with the longitudinal axis of the shaft on which that traction wheel is mounted. Thus, when the wheel is viewed in elevation along the line A—A, and in the direction of the arrows a, as shown in Fig. 1, the wheel appears to be circular. It looks very much like the end of a cylinder. When the same wheel is viewed in a direction normal to its face, such as from along the line B—B, and in the direction of the arrows b in Fig. 1, the wheel would appear to be elliptical. The side faces of the wheel, therefore, correspond to generally parallel, oblique sections through a cylinder, which gives the faces an elliptical shape when viewed from the line B—B.

When a wheel of this type is rotated, such as by power delivered from the drive shaft 3, the wheel will roll smoothly and evenly over a flat surface because every point of the tread is equidistant from its axis of rotation. Nevertheless, the tread of the wheel will not move in a straight line but will move sidewise, back and forth, as it rolls, something like a sine curve, and therefore the tread of the wheel will travel over the ground a greater distance than the direct linear movement of the vehicle. This provides a longer periphery or greater tread length for each wheel of a given diameter and therefore the propelling force on the wheel periphery which provides the actual traction, travels through a greater linear distance in doing its work than the actual distance that the vehicle moves. In this respect, it is similar to a helical cam or to an inclined surface which requires less force to move a given weight, such as a vehicle through a selected vertical distance.

If the path of the vehicle is over a road or ground in which other vehicles of the ordinary type have formed ruts, this improved traction wheel will not usually sink into the rut, but will always be bridging it and crossing it from side to side as the wheel rotates. If, however, the ground over which the wheel is travelling is soft and loose, such as soft mud or sand, the side walls of the rut would not sustain the load and the wheel would sink into this soft ground. When this happens, the wheel, in rotating, will present the greater part of each of its side faces alternately to the sand or loose ground and give a broad area which pushes against the sand, mud or soft ground, something like a propeller blade in water. This propeller or blade pushing, plus the traction of the tread of longer length, exerts the maximum possible pushing effort on the vehicle with a wheel of minimum diameter. Since the faces of the wheel alternately do the pushing, and the faces are oblique to the direction of the travel of the vehicle, the pushing will be first somewhat to one side and then to the other side, as well as forwardly.

The two wheels 7 on the end of each axle are fixed on the axle with the faces of one non-parallel to those of the other wheel on that same axle. In Fig. 1 the major axes of the elliptical faces 9 of one wheel 7 are disposed 90 degrees ahead of those of the other wheel on the same axle, angularly about the axis of rotation of that shaft 4 or 5 which mounts these wheels. Thus, when the major axis of an elliptical face of the inner one of a pair of wheels on the axle shaft 4 lies in a vertical plane through the axis of rotation of shaft 4, the major axis of a side face of the other wheel of that pair will lie in a horizontal plane through the same axis of shaft 4, as shown in Fig. 1. With this arrangement of the wheels angularly about the shaft 4, each wheel of the pair will present a maximum face pushing surface acting against the loose dirt in which it is mired, when the other wheel of that pair has little face surface exerting a push on the loose dirt. Thus the rearward push by each pair of wheels, due to their side faces, will be approximately uniform throughout the rotation of the pair, because as the push on the loose dirt by the faces of one wheel of a pair decreases, the corresponding push by the faces of the other wheel of that pair will increase. With such an arrangement, when the outer wheel 7 is in an upright position, as shown in Fig. 1, where it is presenting its maximum pushing surface and exerting maximum pushing effort on soft ground in which the wheels are mired, the other or inner wheel 7 on the same axle shaft 4 will be in an oblique position where its side faces are exerting little or no sidewise pushing pressure on the soft ground.

Then, when the traction wheels travel through another quarter revolution, the outer wheel 7 will be in a position where it does not exert a sidewise pushing action on the soft ground, and the inner wheel will then have a side face thereof exerting a maximum pushing effort on the soft ground into which it has sunk. These conditions reverse every quarter revolution, and as each wheel pushes first on one face and then on the other, and alternately by the wheels, one obtains a substantially continuous push on the soft ground by one wheel or the other at each side of the vehicle. This, with the normal traction of the tread on the ground, gives maximum pushing effort on the vehicle.

The construction illustrated in Fig. 2 is similar to that of Fig. 1 except that the inner wheel of Fig. 2 is turned on the axle one-quarter revolution from the position in Fig. 1, so as to present the wheels in the relative positions shown in Fig. 2. In these positions of the wheels 7 on each axle 4, the two wheels will present their side faces 10 and 11 at an acute angle to each other, so that one wheel pushes on soft ground in one direction with a sidewise component and the other wheel at the same time pushes on the loose ground in the opposite direction with its sidewise component. The sidewise pushing component of each wheel therefore neutralizes or balances the sidewise pushing action of the other wheel on the same axle end.

When the wheels are rotated one-half revolution from the positions shown in Fig. 2, then the faces 10 and 11 will converge in the opposite direction and the other faces 12 and 13 will do the pushing, and they will push in directions away from the wheel, or from the space between the wheels instead of each toward the other wheel of the pair. Thus, any push of either wheel lengthwise on the shaft 4 will be neutralized or balanced by the equal and opposite push of the other wheel of that pair. The push of the two wheels will always be in equal amounts when the side faces of each wheel make the same oblique angle to the shaft axis as those of the other wheel. With such an arrangement there will be no sidewise movement of the vehicle, and the movement of the vehicle will be strictly forward in a straight line.

The treads 8 of the wheels 7 may have any desired pattern or design of ribs, lugs or grousers, such as are now used on the treads of automobile and truck tires. The wheels may also carry pneumatic tires, and the tires would be elliptical in shape lengthwise along the treads.

It will be understood that various changes in the details, materials and arrangements of parts which have been herein described and illustrated in order to explain the nature of the invention, may be made by those skilled in the art within the principle and scope of the invention as expressed in the appended claims.

I claim:

1. An improved traction device comprising a drive shaft, a rear axle having two axle shafts disposed in end to end alinement, and a differential drive mechanism connecting the inner ends of said axle shafts with one end of said drive shaft, a pair of traction wheels fixedly mounted on and rotatable with the outer end of each axle shaft, the plane of the center line of the periphery of each wheel being oblique to the axis of rotation of the axle shaft which mounts it, and said center line plane of each wheel of a pair being nonparallel to that of the other wheel of that pair, the treads of all of said wheels having the same radial distance from said axis of rotation of those wheels, each tread when viewed in a direction parallel to the axis of rotation of said wheel having that tread being circular, and when viewed in a direction oblique to that same axis of rotation being elliptical.

2. The traction device substantially as set forth in claim 1, the major axes of the ellipses of the treads of each pair being disposed at right angles to each other angularly about said axis of rotation of that pair.

3. The traction device substantially as set forth in claim 1, the major axes of the ellipses of the treads of each pair of wheels being disposed in a common plane passing through the axis of rotation of that pair of wheels.

References Cited in the file of this patent

UNITED STATES PATENTS

| Number | Name | Date |
|---|---|---|
| 669,210 | Burch | Mar. 5, 1901 |
| 694,303 | Beskow | Feb. 25, 1902 |
| 851,055 | Beskow | Apr. 23, 1907 |
| 1,074,596 | Becker | Oct. 7, 1913 |
| 1,211,345 | Petersen | Jan. 2, 1917 |

FOREIGN PATENTS

| Number | Country | Date |
|---|---|---|
| 14,453 | Great Britain | Oct. 24, 1887 |